Apr. 24, 1923.　　　　　　　　　　　　　　　　1,453,211
H. THUN
MACHINE FOR MEASURING SURFACE AREAS
Filed Feb. 14, 1922

Patented Apr. 24, 1923.

1,453,211

UNITED STATES PATENT OFFICE.

HERMANN THUN, OF ESSEN, GERMANY, ASSIGNOR TO FRIED. KRUPP AKTIEN-GESELLSCHAFT, OF ESSEN-ON-THE-RUHR, GERMANY.

MACHINE FOR MEASURING SURFACE AREAS.

Application filed February 14, 1922. Serial No. 536,588.

*To all whom it may concern:*

Be it known that I, HERMANN THUN, residing at Essen, Germany, a citizen of the German Republic, have invented a certain new and useful Improvement in Machines for Measuring Surface Areas, of which the following is a specification.

This invention relates to improvements in machines for measuring surface areas of the type in which a series of members which are adaped to be lifted from a support will, when lifted, actuate a counter through the medium of coupling members adapted to be coupled with suitable transferring segments or wheels.

The invention is more especially adapted to be applied to machines for measuring the superficial area of leather, and it has for its object to provide a machine of this kind in which the drive which throws the counter into action is constructed so that the transferring segments or wheels can be mounted in fixed bearings.

Another object of the invention is to provide a machine of the character stated which is compact and simple.

With these and other ends in view the invention consists in the arrangement, construction and combination of parts to be hereinafter described and claimed.

Figure 1:
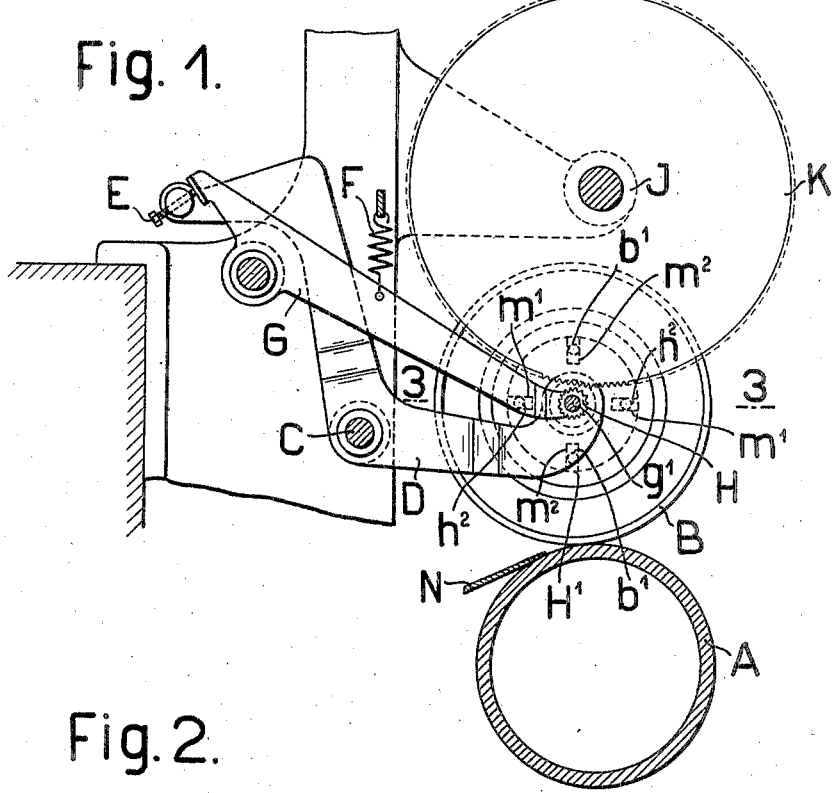
Fig. 1 is a vertical transverse sectional view of the machine, the parts on which the invention has no bearing being omitted.
Figure 2:
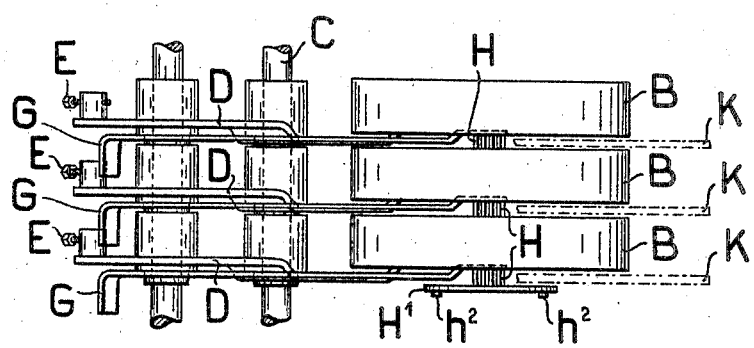
Fig. 2 is a plan view corresponding to Fig. 1, some parts being omitted for the sake of clearness.
Figure 3:
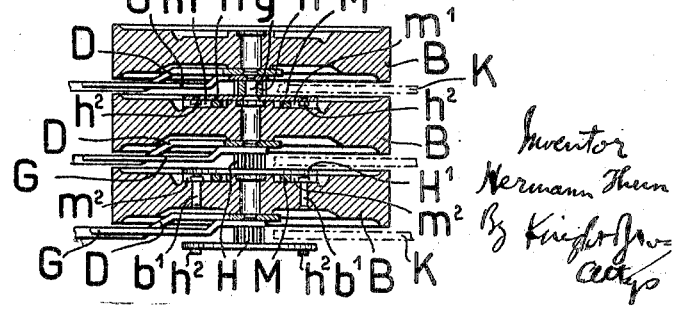
Fig. 3 is a section on the line 3—3 of Fig. 1, seen from above.

Referring now to the drawings in which similar characters of reference denote the same parts, A designates the support formed by a drum which is constantly rotated during the measuring operation and on which rest a series of contact wheels B. Each contact wheel B is rotatively mounted on the short arm of an unequal-armed lever D which is swingingly mounted on a fixed shaft C. The long arm of the lever D carries an adjusting screw E which is engaged by the short arm of another unequal-armed lever G which is under the influence of a spring F. The long arm of the lever G is provided with a pin $g^1$ which rotatively carries a pinion H. K is a spur wheel which forms the above-mentioned transferring wheel. The wheels K are mounted in fixed bearings J and are in a well-known manner, in constant connection with a counter through the intermediary of an adding mechanism (not shown). The pinion H is arranged with relation to the spur wheel K in such a manner that it will enter into engagement with the same when the lever G is swung in counter-clockwise direction, while in the position of the several parts shown in the drawings the pinion H is still out of engagement with the spur wheel K. The pinion H is rigidly connected with a disk $H^1$ which carries two diametrically opposed cam pins $h^2$ (Figs. 1 and 3). The pins $h^2$ project into two radially disposed slots $m^1$ of a plate M which is situated between the pinion H and the cooperating contact wheel B. The plate M possesses still another pair of radially disposed slots $m^2$ which are staggered by an angle of 90° with relation to the slots $m^1$ (see Fig. 1), these four slots $m^1$ and $m^2$ thus forming a cross. The slots $m^2$ are engaged by two cam pins $b^1$ which are fastened to the corresponding contact wheel B. Therefore, by means of the cross-plates M the pinions H are coupled with their corresponding contact wheels B in a kind that a rotation of a contact wheel B will be transmitted to the corresponding pinion H, while at the same time the said two parts H and B can be adjusted independently from each other, vertically with relation to their axis of rotation.

When measuring a piece of leather N the same will move over the drum A (Fig. 1). The contact wheels B which will come into contact with the piece of leather, will be lifted by the same so that the levers D carrying the respective contact wheels, will be swung in a counter-clockwise direction. The corresponding levers G will follow this swinging movement under the action of the springs F so that the respective pinions H will be swung into engagement with their co-operating spur wheels K. As a result thereof, the counter will be put into operation. As the pinions H are mounted on the long arms of the levers G, while the contact wheels B are carried by the short arms of the levers D, a slight lifting motion of a contact wheel B will cause a comparatively large swinging motion of the co-operating pinion H. The consequence is that even if a very thin leather is moved through the machine, the pinions H will be caused to engage the co-operating spur-wheels K in a degree which will secure a perfect co-operation of those parts.

As already mentioned, the arrangement of the cross-plates M allows the pinions H and the co-operating contact wheels B to be moved independently from each other vertically with relation to their axis of rotation. Besides, the arrangement is so that the movement of the contact wheels B away from the drum A can even be continued after the respective pinions H are already completely in mesh with their co-operating spur wheels K, which will be the case when measuring thick leather. This arrangement makes it possible to mount the spur wheels K in fixed bearings J. By interposing the cross-plates M between the pinions H and the contact wheels B the construction becomes simple and compact.

Claims.

1. In a machine for measuring surface areas, in combination, a support over which the body to be measured is moved, members normally resting on the support and adapted to be lifted therefrom by the body to be measured, a series of coupling members adapted each to be engaged with a transferring element, a counter actuated by the said transferring elements, and a coupling between the liftable members and their co-operating coupling members, said coupling being adapted to prevent relative rotation between the liftable members and the coupling members but to allow relative shifting motion between the same in the sense of the lifting motion of the first-mentioned members.

2. In a machine for measuring surface areas, in combination, a support over which the body to be measured is moved, a series of wheels normally resting on the support and adapted to be lifted therefrom by the body to be measured, a series of coupling members consisting of pinions adapted to be engaged with spur wheels, a counter actuated by said spur wheels, and plates between said liftable wheels and the co-operating pinions, slot-and-pin connections between said liftable wheels and said plates as well as between the latter and the pinions, said connections being adapted to allow relative shifting motion between the liftable wheels and the pinions vertically with relation to their axis of rotation.

The foregoing specification signed at Essen, Germany, this 14th day of January, 1922.

HERMANN THUN.